United States Patent [19]

Gonoh et al.

[11] Patent Number: 4,747,712
[45] Date of Patent: May 31, 1988

[54] DEVICE FOR ROTATING AND SUPPORTING A TEMPERATURE PROBE

[75] Inventors: Akira Gonoh; Toshio Masubuchi, both of Nara, Japan

[73] Assignee: Matsushita Electric Industrial Co., Ltd., Osaka, Japan

[21] Appl. No.: 38,454

[22] Filed: Apr. 10, 1987

Related U.S. Application Data

[63] Continuation of Ser. No. 758,230, filed as PCT JP85/00551, Nov. 16, 1984, published as WO85/02456, Jun. 6, 1985, abandoned.

[30] Foreign Application Priority Data

| Nov. 22, 1983 | [JP] | Japan | 58-219816 |
| Jun. 4, 1984 | [JP] | Japan | 59-114971 |
| Jun. 7, 1984 | [JP] | Japan | 59-116964 |
| Jun. 7, 1984 | [JP] | Japan | 59-116963 |

[51] Int. Cl.$^4$ .............. G01K 13/08; H05B 6/64; A47J 37/04
[52] U.S. Cl. .................. 374/149; 374/155; 219/10.55 R; 219/10.55 B; 439/13; 439/669; 99/421 TP
[58] Field of Search ............ 374/149, 153–155, 374/194, 208, 210; 439/1, 4, 5, 13, 21, 668, 669; 252/12.2; 219/10.55 R, 10.55 B; 126/41 A, 338, 373; 99/421 TP

[56] References Cited

U.S. PATENT DOCUMENTS

| 2,244,436 | 6/1941 | Tietig | 252/12.2 |
| 2,717,367 | 9/1955 | Puerner | 339/183 |
| 3,224,967 | 12/1965 | Battista | 252/12.2 |
| 3,418,438 | 12/1968 | Barrett | 339/183 |
| 3,957,331 | 5/1976 | Tantillo et al. | 339/6 R |
| 4,119,572 | 10/1978 | Fridman et al. | 252/508 |
| 4,149,056 | 4/1979 | Kaneshiro et al. | 219/10.55 R |
| 4,542,270 | 9/1985 | Ando | 219/10.55 B |
| 4,547,643 | 10/1985 | Yamauchi | 219/10.55 R |

FOREIGN PATENT DOCUMENTS

| 270533 | 5/1913 | Fed. Rep. of Germany | 165/DIG. 18 |
| 26846 | 11/1968 | Japan . | |
| 155759 | 10/1979 | Japan . | |
| 53643 | 4/1980 | Japan . | |
| 35784 | 4/1981 | Japan . | |
| 136208 | 10/1981 | Japan . | |

Primary Examiner—William A. Cuchlinski, Jr.
Assistant Examiner—W. Morris Worth
Attorney, Agent, or Firm—Spencer & Frank

[57] ABSTRACT

A device for rotatably supporting a temperature probe disposed in an oven for heating a material. The probe has one end provided with a plug and another end for insertion into the material for detecting the temperature thereof. The device includes a socket section secured to one of the wall surfaces of the oven chamber, the socket section nonrotatably supporting a contact mechanism which in turn rotatably and disengageably supports the plug while the contact mechanism receives signals from the temperature probe through the plug.

8 Claims, 8 Drawing Sheets

DEVICE FOR ROTATING AND SUPPORTING A TEMPERATURE PROBE

This application is a continuation of application Ser. No. 758,230, filed as PCT JP84/00551 on Nov. 16, 1984, published as WO85/02456 on June 6, 1985, now abandoned.

TECHNICAL FIELD

The present invention relates to a high-frequency heating apparatus used for a cooking apparatus using a turntable having a temperature probe for detecting the temperature of food to be heated, and more particularly to improvements in a device for rotatably and supporting the temperature probe.

BACKGROUND ART

FIGS. 1 and 2 are schematic sectional views of a conventional high-frequency heating apparatus equipped with a temperature probe having a jack on the oven top plate.

A motor 2 is disposed at the bottom of an oven chamber 1. A turntable 5 supported by rollers 4 is rotatably carried by the motor 2 through a rotary shaft 3. Food 6 placed on the turntable is heated by microwaves. With the temperature detector means 8 of a temperature probe 7 inserted into the food 6, temperature data are transferred through a cable 9 and a plug 10. A jack 11 in a device for rotatably supporting the temperature probe 7 is secured, through a choke cover 12 for preventing leakage of electric waves, to an oven top plate 1A at or adjacent its center axis corresponding to the center of the turntable 5. The plug 10 of the temperature probe 7 is held by a resilient metallic plate 13. Electric signals are adapted to be taken out from an electric output terminal 14A and an electric output terminal 14B pressed by a sleeve 15. These terminals 14A and 14B are insulated from each other by an insulator 16. A resin pipe 17 surrounding the jack 11 assures slide and rotation of the jack 11.

Vapor produced by the food 6 when it is heated, is adapted to be discharged to the outside after having passed through exhaust ports 1B in the oven top plate 1A and a louver means 18A of a body 18.

The plug 10 of the temperature probe 7 is secured to the jack 11 which is rotatable. In order to assure rotation of the jack 11, the pipe 17 is required.

According to such a construction, electric waves may leak from the inside of the oven chamber 1 to the outside. In order to prevent such leakage, a large choke cover 12 is indispensable, so that the apparatus is complicated in construction and is relatively large.

FIG. 2 illustrates the high-frequency heating apparatus of FIG. 1 with the temperature probe 7 removed from the temperature probe mounting unit, so that the apparatus is used as a normal microwave oven.

When the apparatus is used in such way, the temperature probe 7 and the jack or device 11 for rotatably supporting the temperature probe 7 are exposed directly to vapor, oil or stock produced from heated food in the heating chamber. In particular, the inside of the probe rotatably supporting device or jack 11 which is hermetically sealed, is always filled with vapor. The resilient metallic plate 13, the sleeve 15 and the insulator 16 therefore get rusty and dirty, thus provoking an increase in contact resistance and decrease in insulation resistance. When the temperature probe 7 is inserted into the jack 11 to be connected thereto as necessary, such increase in contact resistance and drop in insulation resistance disable accurate transmission of electric signals to a temperature control circuit disposed outside of the oven. In the worst case, no electrical conduction is made.

In the inside of the probe rotatably supporting device or jack 11 which is filled with vapor, vapor is converted into waterdrops due to dew condensation. The waterdrops are therefore attached to the resilient metallic plate 13, the sleeve 15 and the insulator 16. The resilient metallic plate 13 is connected to the sleeve 15 through such waterdrops. Resistance is therefore produced on the electric output terminals 14A and 14B. The control circuit outside of the oven is actuated as the temperature probe 7 would be inserted in the jack 11 to be connected thereto, thereby to erroneously stop normal microwave oven operation. Until such communication through waterdrops is removed, normal microwave oven operation cannot be obtained.

Moreover, the hermetical sealing construction of the probe rotatably supporting device or jack 11 delays evaporation of such waterdrops. It disadvantageously takes much time before normal operation is obtained.

DISCLOSURE OF THE INVENTION

The present invention is proposed to eliminate the defects of the prior art and provides highly reliable high-frequency heating apparatus having a simplified device for rotatably supporting a temperature probe, which performs no erroneous operation.

In a temperature probe-equipped cooking apparatus adapted to control a heating source according to the food temperature detected by a detector means which is adapted to be inserted into a heated food on a turntable rotatably disposed in an oven chamber, the device for rotatably supporting the temperature probe in accordance with the present invention is disposed at or adjacent to the center of the oven top plate corresponding to the center of the turntable. Connection of the probe rotatably supporting device with the temperature probe is made by a removable construction of a plug-jack engagement. The jack has resilient contact pieces including contact portions, and a body for holding the contact pieces. With the plug inserted into the jack, the plug is held by four contact portions of the resilient contact pieces. These contact portions at each of the measuring terminal side and at the grounding side are located at opposite positions to hold the plug, from which electric signals are taken out to detect the temperature of food to be heated.

The jack body is made of a non-metallic material such as resin, and has a sleeve for guiding the plug and holes for mounting the jack to the oven chamber.

The plug, the sleeve and the contact portions of the contact pieces of the jack are made of metal. Either the plug or the sleeve and contact pieces are made of a soft metallic material impregnated with oil. The jack body has in its upper portion a vapor hole, above which a heat conductive plate is disposed.

With such arrangement, the temperature probe may be removably taken out at its plug from the oven chamber. With the rotation of food on the turntable, the temperature probe is rotated together with the food. The use of a soft material such as copper impregnated with vegetable oil assures a smooth rotation of the temperature probe.

The vapor hole and the heat conductive plate are formed and disposed for prevention of contamination and dew condensation. Moreover, resilient contact of the plug with at least four contact portions permits a stable electrical output to be taken out.

BEST FORM TO PRACTICE THE PRESENT INVENTION

The following description will discuss one embodiment of the present invention with reference to the attached drawings.

Figure 1:
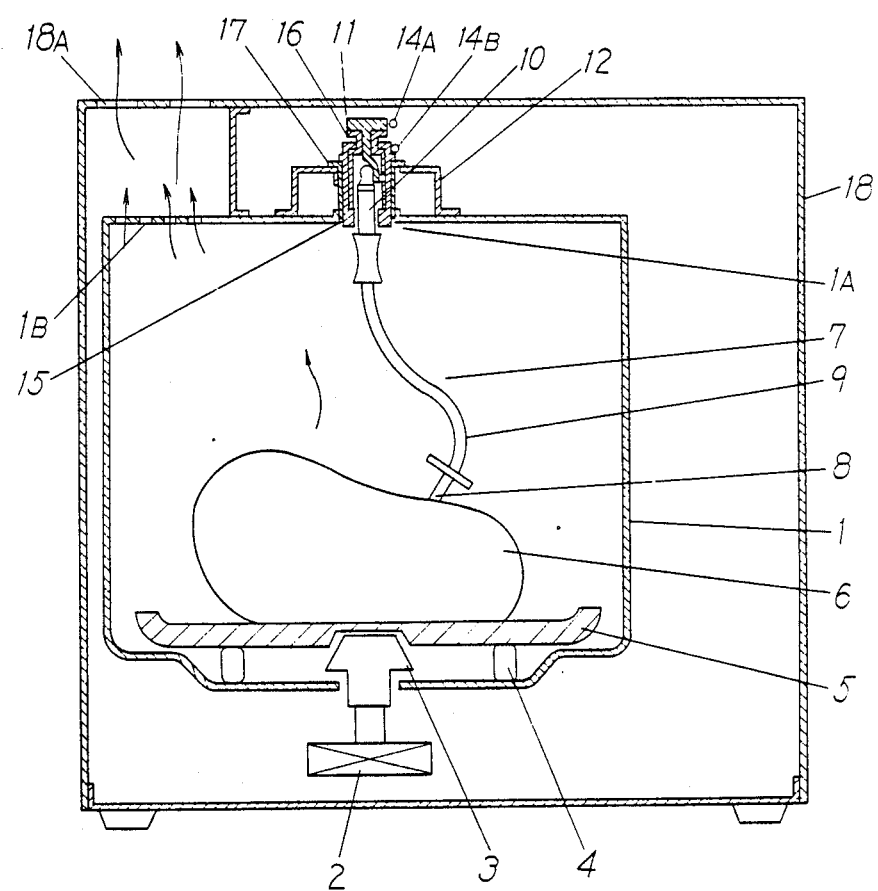
FIG. 1 is a section view of a high-frequency heating apparatus equipped with a conventional jack in which the temperature probe is used.
Figure 2:
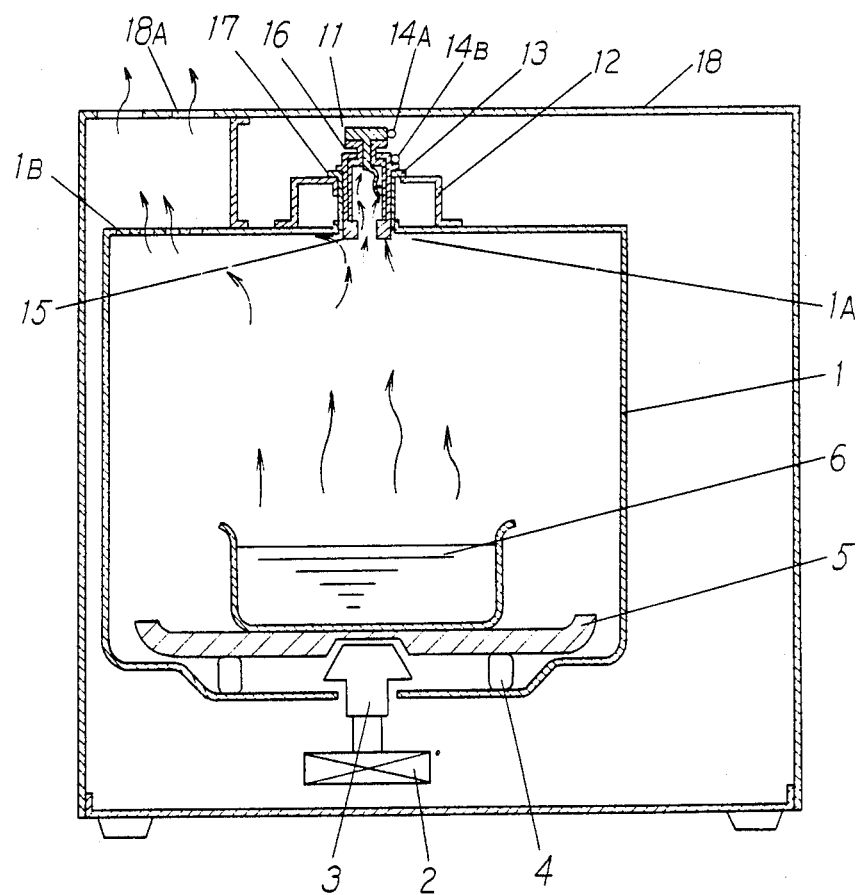
FIG. 2 is a section view of the apparatus in FIG. 1 used as a microwave oven.
Figure 3:
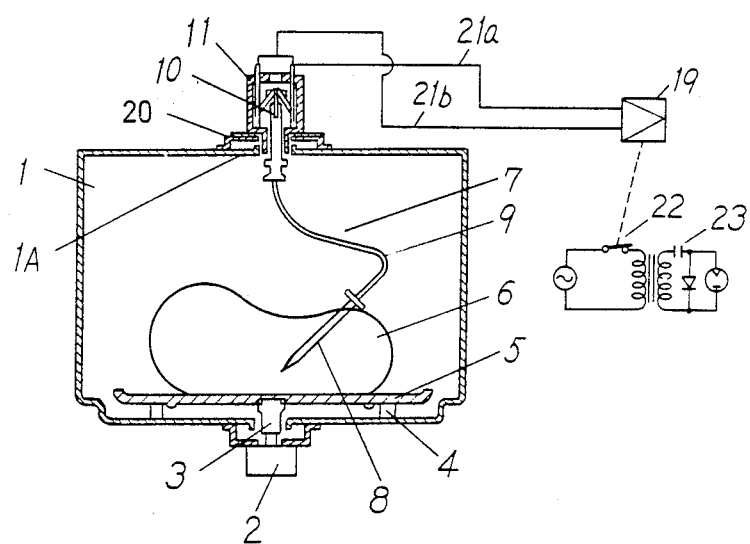
FIG. 3 is a schematic view of a temperature probe-equipped high-frequency heating apparatus having a device for rotatably supporting a temperature probe in accordance with the present invention.

FIG. 3 is a schematic view of a temperature probe-equipped high-frequency heating apparatus having a device for rotatably supporting a temperature probe in accordance with the present invention.

A motor 2 is disposed at the bottom of an oven chamber 1. A turntable 5 supported on rollers 4 is rotatable by the motor 2 through a rotary shaft 3. Food 6 placed on the turntable 5 is heated by microwaves.

With a temperature detector means 8 of a temperature probe 7 inserted into the food 6, temperature data as electric signals are transmitted to a magnetron control circuit 19 through a cable 9 and a plug 10.

A device or jack 11 for rotatably supporting the temperature probe 7 is screw-fixed, through a mounting plate 20, to an oven top plate 1A at or adjacent its center corresponding to the center of the turntable 5. To the jack 11, the plug 10 of the temperature probe 7 is connected mechanically and electrically such that the electric signals above-mentioned are transmitted to signal lines 21a and 21b.

When the temperature of the food 6 reaches a predetermined finish temperature with heating by microwaves, the magnetron control circuit 19 opens a switch 22 to shut off the supply of power to a magnetron power circuit 23, thus stopping the operation of the high-frequency heating apparatus.

Figure 4:
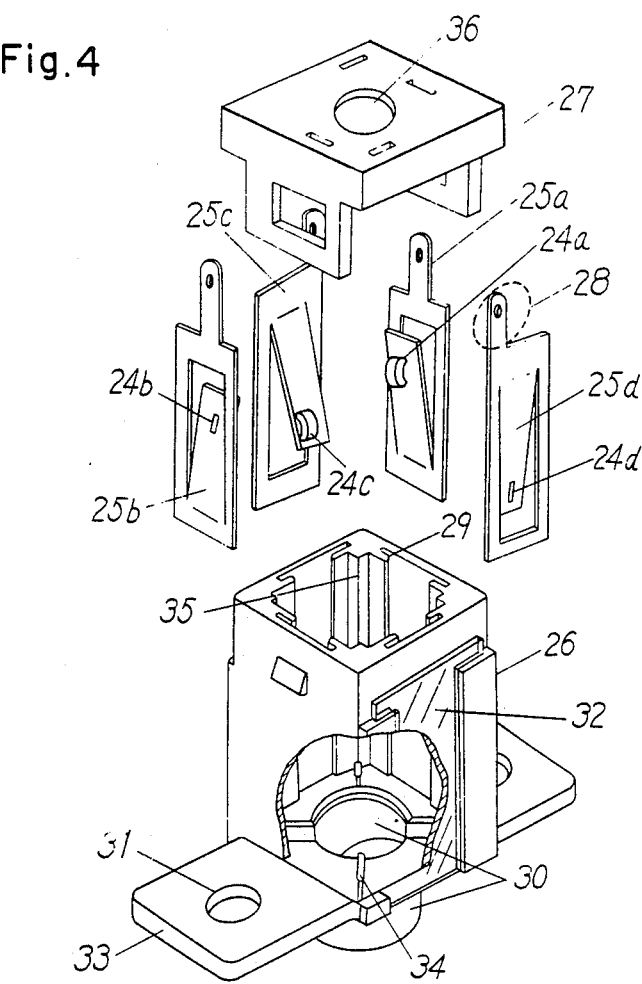
FIG. 4 is a perspective & exploded view of the probe rotatably supporting device of the present invention.
Figure 4:
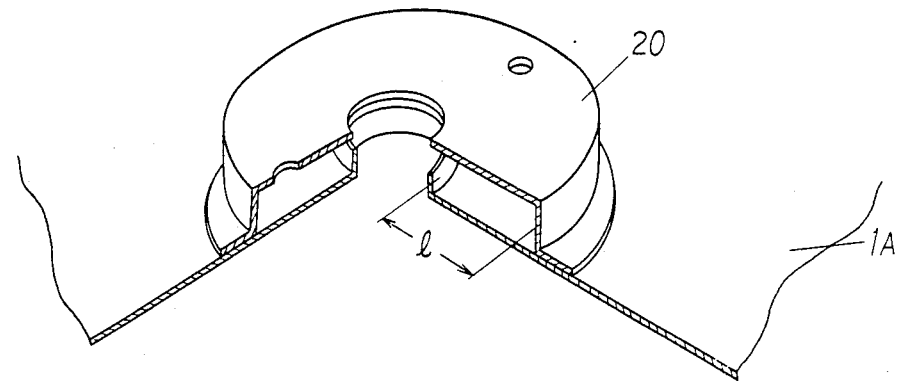

The following description will discuss the probe rotatably and supporting device or jack 11 with reference to FIG. 4.

The probe rotatably supporting device 11 includes four contact pieces 25a, 25b, 25c and 25d respectively having control portions 24a, 24b, 24c and 25d, a body 26 for fixing these contact pieces 25a, 25b, 25c and 25d, and a body cap 27 for preventing these contact pieces 25a–d from coming out.

The contact pieces are constituted by the contact pieces 25a and 25b at the measuring terminal side, and the contact pieces 25c and 25d at the grounding side. The grounding line is connected to the jack 11 through a printed circuit board for a control circuit (not shown).

Each of the contact pieces 25a, 25b, 25c and 25d is cut at the center portion thereof into a substantially U shape. The cut portions are inwardly turned to provide resiliency. Semi-spherical contact portions 24a, 24b, 24c and 24d made of a soft and conductive material such as copper are attached to the tips of the cut portions by calking or the like. The contact pieces 25a, 25b, 25c and 25d have projecting portions 28 as electric output portions.

The body 26 made of a non-metallic material such as resin is opened at its top, and has in its inner four faces, grooves 29 for fixing the contact pieces 25a–d. The body 26 has its lower portion a sleeve 30 and a metallic plate 33 which has holes 31 and T-shape plates 32 for fixing the body 26. The sleeve 30 is made of a soft and conductive material, such as copper, impregnated with vegetable oil, and is attached to the metallic plate 33 by calking or the like. By the inner surface of the sleeve 30, the plug 10 of the temperature probe 7 is supported such that the inclination of the plug 10 during rotation is restrained.

In order to provide insulation distances between the contact pieces having different polarities, there are disposed four radial insulation walls 34 around the sleeve 30 and insulation walls 35 projecting from the inner four corners of the body 26. Such insulation walls 34 and 35 prevent dew condensation of vapor, thereby to prevent the contact pieces having different polarities from being short-circuited. The body cap 27 has in its center a vapor hole 36 having a diameter of about 6–10 mm.

A temperature probe metal mounting plate 20 is spot-welded to the oven top plate 1A. The size 1 of the space formed by the metal mounting plate 20 and the oven top plate 1A is about ¼ of the wave length of a high-frequency electric wave. It is to be noted that the safety standards as to the permissible amount of electric wave leakage are satisfied even though such size 1 is other than ¼ of the wave length of the high-frequency electric wave.

Figure 5:
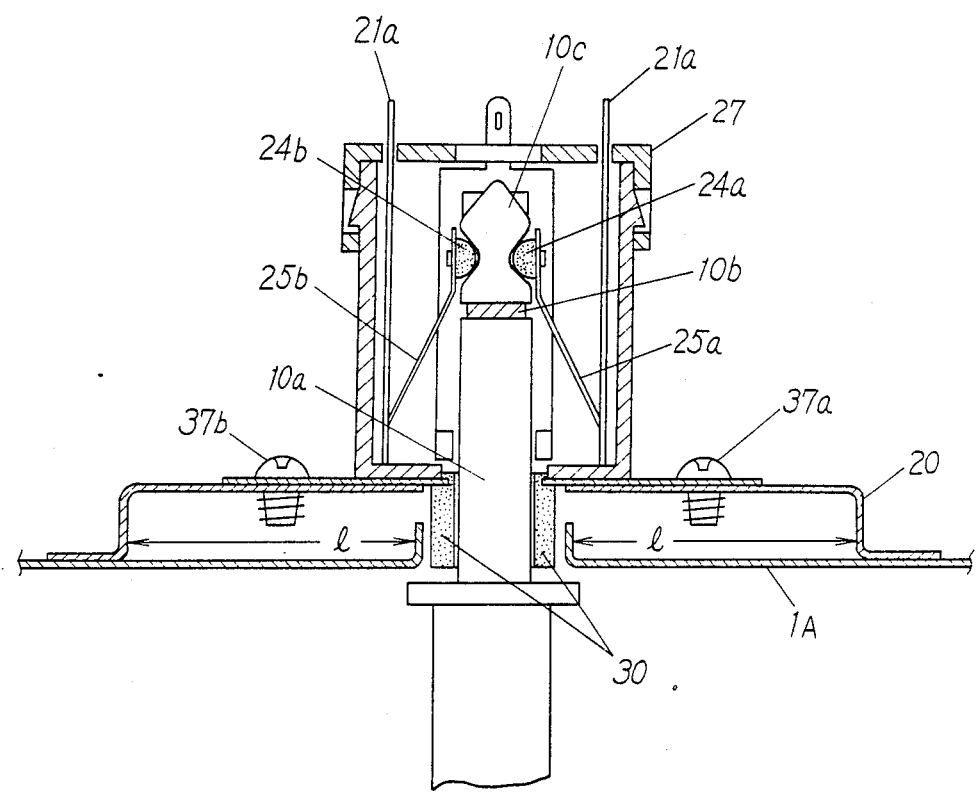
FIG. 5 is a section view of the probe rotatably supporting device of the present invention into which a plug is inserted.

FIG. 5 is a section view of the jack 11 mounted to the oven top plate 1A through screws 37a and 37b with the plug 10 of the temperature probe 7 inserted into the jack 11. In FIG. 5, the contact pieces 25a and 25b at the measuring terminal side are shown. The plug 10 has a conductor 10a (at the grounding side), an insulator 10b and a tip conductor 10c (at the measuring terminal side).

Figure 6:
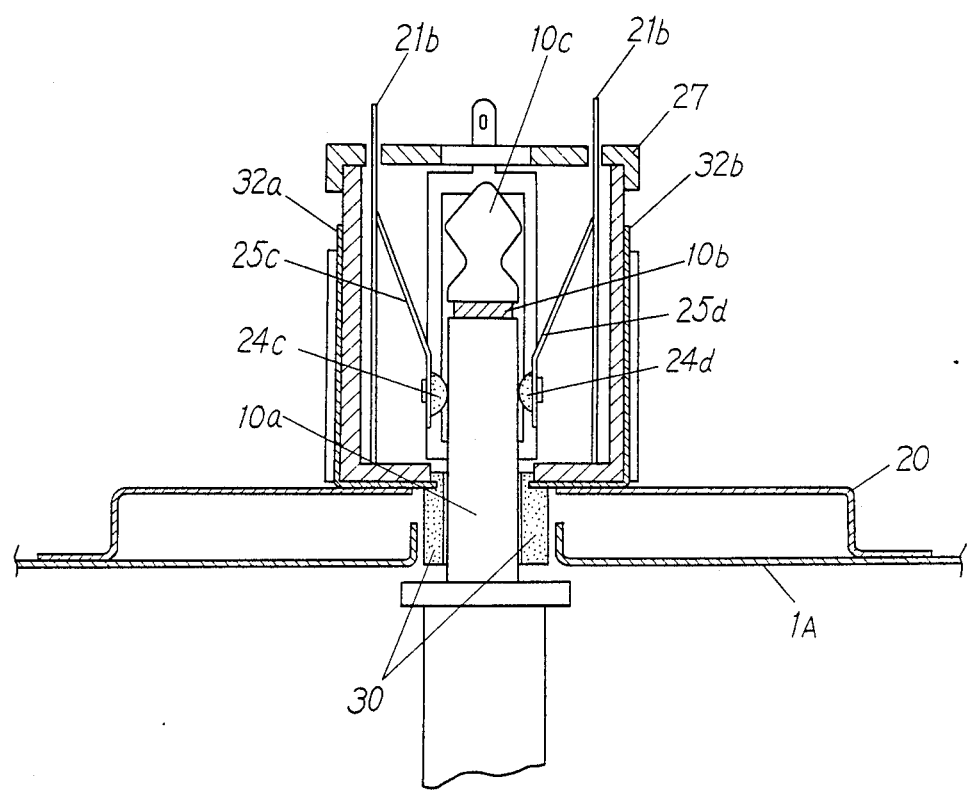
FIG. 6 is a similar view to FIG. 5 with the view position changed by 90°.

FIG. 6 is a similar view of FIG. 5 with the view position changed by 90°. The following description will be made with reference to FIGS. 5 and 6.

The contact portions 24a and 24b of the contact pieces 25a and 25b at the measuring terminal side resiliently engage and are pressingly contacted with the concave portion of the tip conductor 10c so as to mechanically hold the plug 10. At the same time, the contact portions 24c and 24d of the contact pieces 25c and 25d at the grounding side resiliently engage and are pressingly contacted with the conductor 10a of the plug 10. With the plug 10 attached to the jack 11, the temperature probe 7 is hung down from the oven top plate 1A.

Accordingly, when food 6 placed on the turntable 5 is rotated, the plug 10 of the temperature probe 7 is smoothly rotated together with the food 6 even though the cable 9 of the temperature probe 7 tends to be twisted. Thus, there is no risk that the cable 9 is actually twisted. Correct temperature data are therefore transmitted to the electric signal lines 21a and 21b.

The contact portions 24a-d and the sleeve 30 are made of a soft and conductive material such as copper. Therefore, when the plug 10 is rotated, the rotary contact portions are not damaged to assure a smooth rotation of the plug 10.

Two contact portions at each of the measuring terminal side and the grounding side are located at opposite positions to hold the plug 10. While the plug 10 is rotatingly contacted with the contact portions, electric signals which are always stable, are transmitted directly from the plug 10. Two contact portions at each of the measuring terminal side and the grounding side are always in contact with the plug 10 by a resilient pressing force. Even if contact of one of these two contact portions with the plug is momentarily insufficient due to dirt or dust, the other is contacted with the plug, so that an electrical output can be stably taken out.

Figure 7:
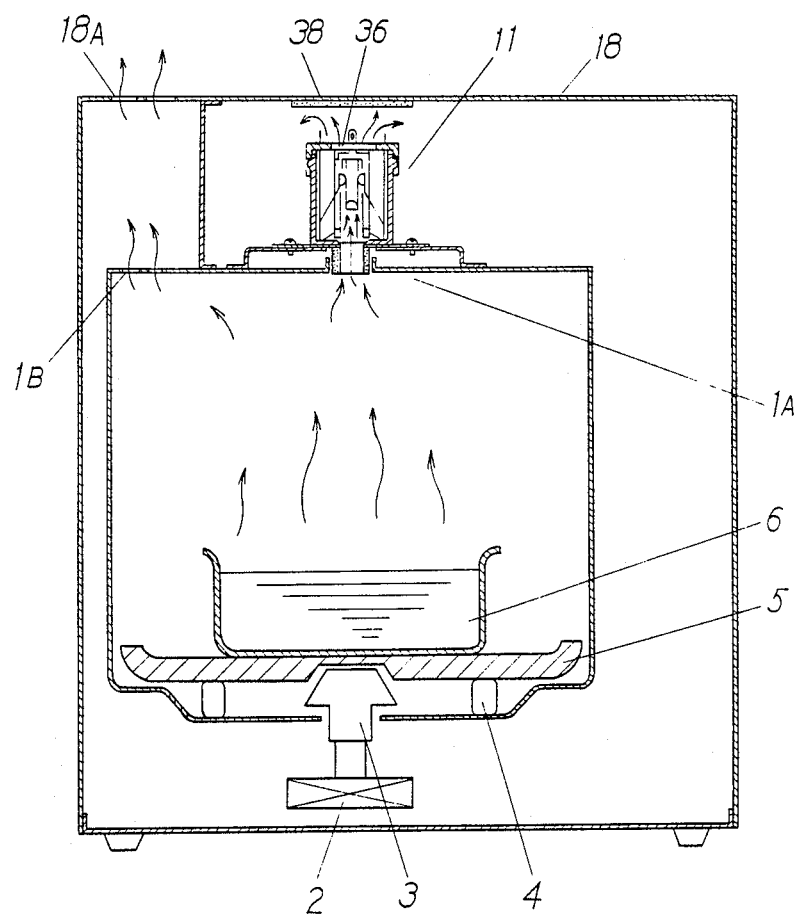
FIG. 7 is a section view of the apparatus in FIG. 3 used as a microwave oven.

FIG. 7 is a section view of the high-frequency heating apparatus having the probe rotatably supporting device 11, when it is used as a microwave oven.

A heat conductive plate 38 is disposed above the vapor hole 36 in the body cap 27 of the jack body 26.

When the high-frequency heating apparatus is used with the temperature probe not in use, the probe rotatably supporting device 11 is exposed directly to vapor, oil or food stock generated from a heated food in the heating chamber. However, vapor entering into the device 11 through the sleeve 30 is discharged to the outside after having passed through the vapor hole 36 in the body cap 27 at its center portion, thereby restraining dew condensation of such vapor.

Even if vapor is condensed in the probe rotatably supporting device 11, the insulation walls 34 and 35 separate such condensed waterdrops from the contact pieces, thereby to prevent the contact pieces having different polarities from being short-circuited.

Moreover, when the plug 10 is inserted, contamination of the contact portions 24a-d may be scrapted off. Stable electric signals are thus taken out at all times.

When vapor discharged to the outside of the oven chamber 1 strikes directly against the body 18, such vapor is converted into waterdrops due to temperature diference. Such waterdrops then fall on the probe rotatably supporting device 11 or in the oven chamber 1 through the vapor hole 36. According to the present invention, however, provision of the heat conductive plate 38 prevents such vapor from being condensed, thus eliminating the inconvenience above-mentioned.

Instead of the heat conductive plate 38, a vapor absorbing material such as cushion rubber may be used. With the use of such vapor absorbing material, stable electric output may be taken out at all times.

Figure 8:
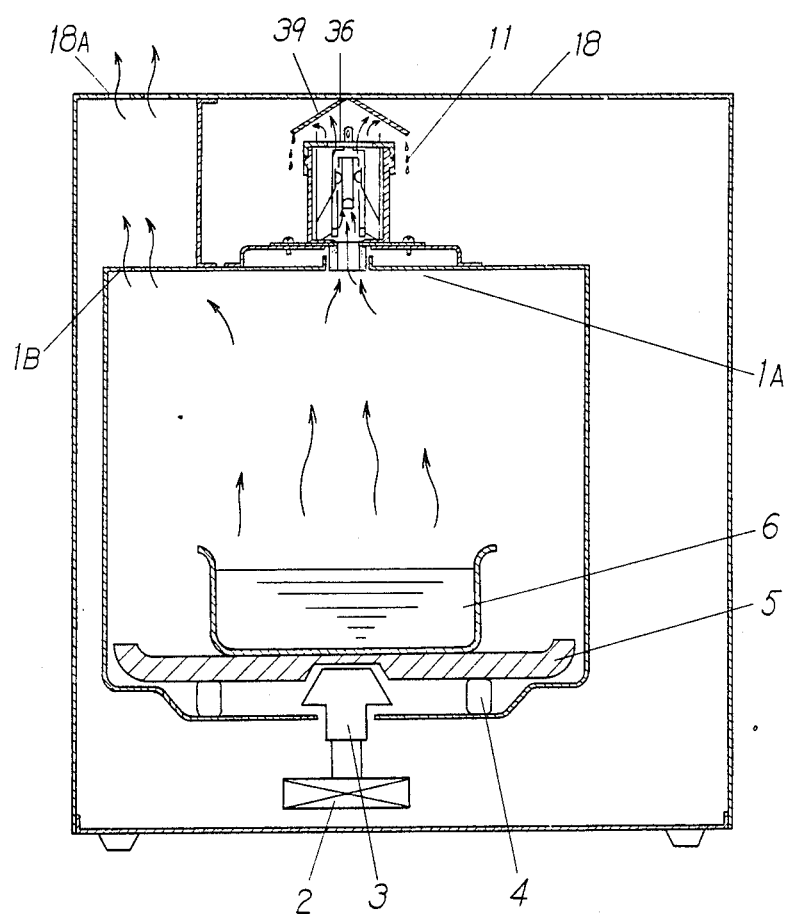
FIG. 8 is a section view of a high-frequency heating apparatus including another example of a dew condensation preventive means.

FIG. 8 is another example of a dew condensation preventive arrangement in which a dew condensation member 39 of the cone shape is disposed on the probe rotatably supporting device 11.

When vapor discharged through the vapor hole 36 of the probe rotatably supporting device 11 strikes against the body 18, such vapor is condensed to be converted into waterdrops due to temperature difference. Such waterdrops fall on the probe rotatably supporting device 11 or in the oven chamber 1 through the vapor hole 36. When such waterdrops fall in the oven chamber 1, the waterdrops strike against the contact portions 24a-d and are therefore accumulated in the probe rotatably supporting device 11. According to the present invention, however, vapor discharged through the vapor hole 36 is condensed at the cone-shape dew condensation member 39 disposed above the probe rotatably supporting device 11, the size of the member 39 being larger than that of the probe rotatably supporting device 11. Waterdrops thus converted from the vapor flow along the peripheral edge of the cone-shape member 39 and then fall on the oven top plate 1A. Thus, no waterdrops fall in the probe rotatably supporting device 11. Therefore, the output portions 28 are not electrically conducted by waterdrops, thus eliminating the risk of malfunction.

The metal mounting plate 20 and the oven top plate 1A form a choke circuit, and connection between the temperature probe 7 and the sleeve 30 of the jack 11 is made in metal. Thus, the high-frequency heating apparatus in accordance with the present invention may be safely used without any leakage of electric waves in the oven chamber 1.

As thus discussed hereinbefore, according to the device for rotatably supporting a temperature probe of the present invention, the plug 10 of the temperature probe 7 may be attached to or removed from the oven chamber 1. When food 6 is rotated by the turntable, the plug 10 itself may be rotated together with the food 6.

(1) Two contact portions at each of the measuring terminal side and the grounding side are located at plural positions which are opposed to each other, and are contacted with the plug by a resilient pressing force, thus permitting transmission of signals stable at all times.

(2) The vapor hole in the body cap permits vapor to be discharged to the outside, thus restraining contamination and dew condensation.

(3) Even if vapor is condensed, insulation walls disposed in the jack body prevents the contact pieces having different polarities from being short-circuited.

(4) Vapor discharged to the outside through the vapor hole in the body cap, is absorbed by the heat conductive plate, thereby to prevent dew condensation. Thus, no waterdrops fall in the probe rotating and supporting device.

(5) Electric signals are taken out directly from the plug. Thus, a predetermined function is achieved with a simple construction, thereby to form the apparatus in a small size. Economical production is thus made.

INDUSTRIAL UTILITY

As thus discussed hereinbore, the present invention provides a highly reliable device for rotatably supporting a temperature probe to be used in a high-frequency heating apparatus, which assures rotation of the probe plug with a simple construction and eliminates malfunction resulted from dirt such as vapor, oil or food stock generated from a heated food.

What is claimed is:

1. A device for rotatably supporting a temperature probe disposed in an oven chamber of an oven for heating materials, said temperature probe having a plug at one end thereof and having another end for insertion into a material to be heated for detecting the temperature thereof, said oven chamber having wall surfaces, comprising
a socket section having a body with means for securing said socket section to one of the wall surfaces of the oven chamber, said body having a top part with a vapor hole formed therein, said socket section further including contact means nonrotatably supported by said body and arranged for rotatably and disengageably supporting said plug, said contact means receiving signals from said temperature probe through said plug; and preventing means arranged on a portion of a top plate of said oven directly above said vapor hole for preventing waterdrops formed by condensation of vapor ascending through said vapor hole, from falling back through said vapor hole, said preventing means having an inner conical surface with an edge radially extending beyond an area occupied by said socket section arranged therebelow so that water droplets formed by condensation on said inner conical surface run down said inner conical surface and fall outside said area occupied by said socket section.

2. A device for rotatably supporting a temperature probe as set forth in claim 1, wherein either of said plug and said contact portions is made of metal impregnated with vegetable oil.

3. A device for rotatably supporting a temperature probe as set forth in claim 1, wherein said plug includes a measuring side terminal portion and a grounding side terminal portion, said contact means includes two pairs of contact portions, the contact portions of each pair being opposed to each other, each said pair of opposed contact portions being arranged to contact with a respective one of said measuring side terminal portion and said grounding side terminal portion of said plug.

4. A device for rotatably supporting a temperature probe as set forth in claim 3, wherein said contact portions are made of resilient materials, and the distance between the opposed contact portions of each pair is less than the diameter of said plug.

5. A device for rotatably supporting a temperature probe disposed in an oven chamber of an oven for heating materials, said temperature probe having a plug at one end thereof and having another end for insertion into a material to be heated for detecting the temperature thereof, said oven chamber having wall surfaces, comprising a socket section having a body with means for securing said socket section to one of the wall surfaces of the oven chamber, said body having a top part with a vapor hole formed therein, said socket section further including contact means nonrotatably supported by said body and arranged for rotatably and disengageably supporting said plug, said contact means receiving signals from said temperature probe through said plug; and preventing means arranged on a portion of a top plate of said oven directly above said vapor hole for preventing waterdrops formed by condensation of vapor ascending through said vapor hole, from falling back through said vapor hole, said preventing means comprising a vapor absorbing material.

6. A device for rotatably supporting a temperature probe as set forth in claim 5, wherein either of said plug and said contact portions is made of metal impregnated with vegetable oil.

7. A device for rotatably supporting a temperature probe as set forth in claim 5, wherein said plug includes a measuring side terminal portion and a grounding side terminal portion, said contact means includes two pairs of contact portions, the contact portions of each pair being opposed to each other, each said pair of opposed contact portions being arranged to contact with a respective one of said measuring side terminal portion and said grounding side terminal portion of said plug.

8. A device rotatably supporting a temperature probe as set forth in claim 7, wherein said contact portions are made of resilient materials, and the distance between the opposed contact portions of each pair is less than the diameter of said plug.

* * * * *